May 13, 1941.　　　W. B. CONNOLLY　　　2,241,983

MAGNETIC DRIVING MECHANISM

Filed Nov. 17, 1937

*INVENTOR*
WILLIAM B. CONNOLLY
BY
*Eric Schinger*
ATTORNEY

Patented May 13, 1941

2,241,983

UNITED STATES PATENT OFFICE 2,241,983

MAGNETIC DRIVING MECHANISM

William B. Connolly, Rochester, N. Y., assignor to Rochester Manufacturing Company, Rochester, N. Y.

Application November 17, 1937, Serial No. 175,081

2 Claims. (Cl. 172—234)

This invention relates to magnetic driving mechanism for magnetically transmitting the movement of an operating member to an indicator or other driven member and the invention has for its principal object to provide a novel magnetic drive which is positive in action and will operate an indicator or other driven member with a steady movement over its full range of movement.

Another object of this invention is to provide a magnetic drive which effects a magnetic "dampening" on the driven member not obtainable in other magnetic drives.

Another object of this invention is to provide a magnetic drive in which the "driven" magnet will not be "reversed" in polarity if accidentally held over the opposing poles of the "driven" magnet.

A further object of this invention is to provide the magnetic drive with a novel form of movement transmitting magnet which will efficiently transmit its full range of movement to an indicator or other driven member.

A still further object of this invention is to provide both the operating and the indicating members of a gauge or any other driving and driven member with a movement transmitting magnet of novel design and substantially equal magnetic strength, weight and mass to eliminate any appreciable lag between the movement of the magnets and prevent a spinning of the driven magnet on a sudden acceleration or deceleration of the driving magnet.

Another object of this invention is to provide the magnetic drive with a novel ring magnet of the "consequent" pole type in which the poles are diametrically arranged on the face of the magnet or in modified form on the periphery.

Still another object of this invention is to provide the magnet drive with a ring magnet of the consequent pole type in which the diametrically arranged poles are slightly offset from the face of the magnet.

Another object of the invention is to provide a ring magnet with a novel mounting and connecting member.

All these and other objects and attendant advantages of the invention will become more readily apparent from the detailed description of one embodiment of the invention, reference being had to the accompanying drawing in which Figure 1 is a vertical sectional view of a liquid level gauge provided with my novel magnet drive.

Figure 2:
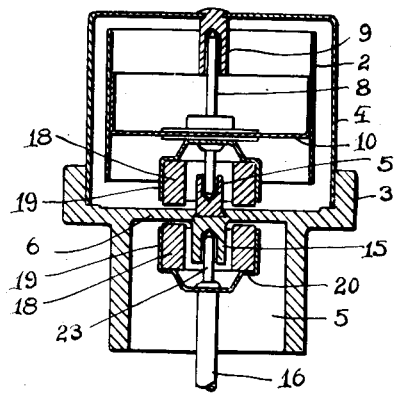
Figure 2 is a detail perspective view of one of the ring magnets used in my novel magnet drive.
Figure 2:
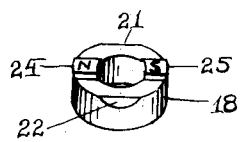
Figure 3:
Figure 3 is a detail perspective view of the mounting and connecting member of one of the ring magnets.

The magnetic driving mechanism, forming the subject matter of my present invention, may be used in substantially all forms of gauges or in meters, toys, sign-flashers, contact switches etc., but for illustrative purposes I have shown and described it in connection with a float operated liquid level gauge in which the swinging movement of the float 1 is transmitted to the cylindrical dial 2 and simultaneously translated into an oscillating movement thereof. The gauge comprises the body member 3 which supports the dial housing 4 at the top and provides a magnet chamber 5 at the bottom. The body member is made of non-magnetic material in order that the horizontal wall 6, which forms a part thereof and separates the magnet chamber from the dial housing, permits substantially unobstructed passage of magnetic flux therethru.

Centrally anchored on top of the wall 6 within the dial housing is the pivot bearing 7 and in it is pivotally supported the lower end of the dial stem 8. The upper end of the dial stem is pivotally mounted in the pivot bearing 9 which is carried on the under side of the top of the dial housing 4. The dial stem is thus free to oscillate within the dial housing and carries the cup shaped rocker 10 which in turn supports the cylindrical dial 2.

The float mechanism for the operation of the dial comprises the float arm 11 which carries the float 1 at the outer free end and has its other end suitably attached to the segmental pinion 12. The latter is mounted to oscillate on a pivot stud 14 which is supported from the body member by a suitable frame (not shown).

Centrally located in the top of the magnet chamber 5 is a pivot bearing 15 in which is journaled the upper end of the transmission shaft 16. The lower end of this shaft is pivotally supported on the stud 14 so that the shaft 16 is free to oscillate between these bearings. The transmission shaft carries the pinion 17 so as to mesh with the segmental pinion 12 and be driven thereby. In this way the vertically swinging movement of the float arm about a horizontal axis is transmitted to and translated into an oscillating movement of the vertically journaled transmission shaft.

The magnetic drive which is used to transmit the motion of the shaft 17 to the dial 2 and forms the subject matter of this invention, comprises a pair of ring shaped permanent magnets 18, 18. These magnets are made of forged steel or are cast from such alloy material as "Alnico" or other alloy material which is adapted to be permanently magnetized and retains a maximum magnetism.

Magnetic alloy material is extremely hard and therefore difficult to mount and connect so as to move with a driving or driven member. Furthermore the shape of a ring, whether of hardened steel or alloy metal, is difficult to mount for rotation around its central axis. For this reason each of the ring magnets is fixedly mounted in a cup shaped mounting member 19 which is preferably formed of nonmagnetic sheet metal. The mounting member is provided with the annular seat 20 on which the bottom of the ring magnet rests so as to have the magnetic poles in the top of the magnet project a predetermined uniform distance above the mounting member.

Figure 5:
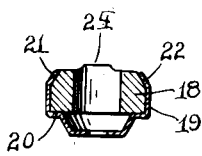
Figure 5 is a vertical sectional view of the magnet assembly, the section being taken on the line 5x—5x of Figure 4.
Figure 4:
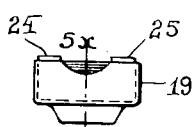
Figure 4 is a detail side elevation of a magnet assembly comprising a ring magnet anchored in its mounting and connecting member.
Figure 1:
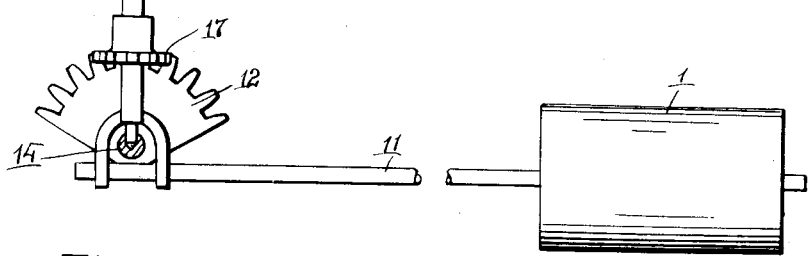

For the purpose of holding the magnet fixed in the mounting member and form a moving unit therewith without the aid of separate fastening means, the edge of the top of the ring magnet is beveled at diametrically opposite points 21 and 22 and the upper edge of the mounting member is crimped over these beveled edges as illustrated in Figure 5. This holds the magnet in place in the mounting and at the same time retains alignment by preventing it from rotating therein. The bottom of the cup shape mounting is depressed or offset in the center and the bottom of the depression is perforated to have a pivot or shaft member therethru and be anchored thereto.

The transmission shaft 16 is provided with a reduced pivot stem 23 which extends thru the perforation in the bottom of the mounting member to be suitably clamped or otherwise fastened thereto to thus fixedly and axially locate the pivot stem within the ring magnet. With the pivot stem 23 journaled in the pivot bearing 15 and the bottom of the transmission shaft pivotally supported on the pivot stud 14, the driving ring magnet is thus pivotally supported in the magnet chamber to be oscillated therein by the transmission shaft with the face of the magnetic poles of the ring magnet in close proximity to the under side of the wall 6.

The driven ring magnet has the dial stem 8 projecting thru its mounting member and suitably clamped or fastened thereto so as to rotate therewith. In this way the dial stem pivotally supports the ring magnet above the wall 6 with the magnetic poles of the magnet in close proximity to the surface thereof so that the poles of both magnets are spaced but slightly more than the thickness of the nonmagnetic wall. The attraction of opposite poles of the ring magnets thus causes these magnets to align themselves in a predetermined position with relation to each other and be magnetically held in this relative position during any movement of the magnet carried by the transmission shaft. Movement of the transmission shaft is thus magnetically transmitted to the dial stem. Each ring magnet provides a parallel magnetic circuit thru its ring shaped body so that the magnetic flux in one ring magnet has a return path for its magnetic flux in the other magnet and vice versa. In this way not only the opposite magnetic poles but also intermediate sections of the ring magnets are magnetically affected by each other. This prevents any appreciable lag in the movement of one magnet with relation to the other and tends to prevent any spinning movement of the magnetically driven magnet by the driving magnet should the driven magnet be quickly accelerated or decelerated in its movement. A magnetic dampening effect is thus produced in my magnetic drive which has heretofore not been obtained in other magnetic drives. The dial movement thus closely follows at all times the movement of the transmission shaft and the relative movement of the float arm.

To get a maximum magnetic pole concentration between the two ring magnets, the outer face of each of the magnets is provided with relatively narrow raised lugs 24 and 25 which are located diametrically opposite each other. The magnets are then magnetized so that these lugs provide the "north" and "south" pole forming a magnet of the "consequent" pole type in which the poles are diametrically arranged on one face of the ring magnet. The reduced area of the pole pieces formed by the lugs thus cause a maximum magnetic concentration in the poles of a ring shaped magnet which directs the magnetic flux thru these pole pieces for a maximum magnetic pull between the poles of the two ring magnets. In this way the poles of two similar ring magnets not only are capable of producing a maximum axial magnetic pull but also a maximum torsional magnetic pull if one magnet is moved with relation to the other.

To make the operation of the magnetic drive accurate, non-reversible and uniform, two ring magnets of substantially equal mass are used in order that the magnetic flux of one will not overbalance the magnetic flux of the other, and the two will have substantially the same momentum in their movement.

Figure 6:
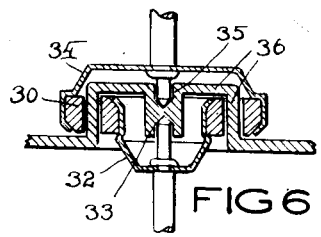
Figure 6 is a vertical sectional view of a modified form of the magnetic driving mechanism.

In Figure 6 I have illustrated a modified form of my magnetic drive in which the ring magnets 30 and 31 are concentrically mounted one within the other. The mounting member 32 of the inner or smaller ring magnet 31 in this case engages into the hollow center of the ring magnet to provide for its pivotal support in the pivot bearing 33 while the large outer ring magnet 30 is embraced on the outside by the mounting member 34 to provide for its pivotal support in the pivot bearing 35. The separating wall 36, thru which the magnetic drive is accomplished, is cylindrical and extends between the inner periphery of the outer ring magnet and the outer periphery of the inner ring magnet and of course both magnets are magnetized so that their respective poles are arranged at diametrically opposite points on the respective outer and inner periphery of the ring magnets. If desired, each magnet may be provided with a pair of lugs, the larger outer magnet on the inner periphery and the smaller inner magnet on the outer periphery and the magnets so magnetized that these lugs provide the respective poles for their magnets in the manner in which the lugs 24 and 25 provide the poles in the ring magnets 18, 18.

From the foregoing it will be apparent that I have devised a new and useful magnetic driving mechanism which embodies the features and advantages enumerated in the statement of the invention and the above description, and while I have, in the present instance shown and described preferred embodiments thereof which will give in practice satisfactory and reliable results, it is to be understood that these embodiments are susceptible of modification without departing from the spirit of the invention or sacrificing any of its advantages.

I claim:

1. In a magnetically non-reversible coupling for gauges etc. the combination of two like, ring shaped permanent magnets of substantially equal mass, equal magnetic strength and uniform polarity, magnetic poles arranged diametrically on opposing faces of said magnets, an imperforate wall between said permanent magnets, a stem adapted to oscillate on each side of said wall in line with each other, and supporting means carried by each of said stems for pivotally and spacedly supporting said magnets magnetically coupled thru said non-magnetic wall axially in line with each other and with the inner periphery of the magnets radially spaced from said stems.

2. In a magnetically non-reversible coupling for gauges etc. the combination of two like, ring shaped permanent magnets of substantially equal mass, equal magnetic strength and uniform polarity, magnetic poles arranged diametrically on opposing faces of said magnets, an imperforate wall between said permanent magnets, a pivot bearing on each side of said non-magnetic wall opposite each other, a stem mounted to oscillate in each of said bearings, a supporting cup carried by each of said stems for support of said magnets with the inner periphery of the magnets radially spaced from said stems and said permanent magnets being arranged axially in line with each other and magnetically coupled thru said non-magnetic wall for oscillation with and uniform spacing by said stems in said pivot bearings, and means provided on each of said magnets for locking engagement with its supporting cup.

WILLIAM B. CONNOLLY.